US012756684B2

(12) United States Patent
Gao

(10) Patent No.: US 12,756,684 B2
(45) Date of Patent: Oct. 6, 2026

(54) ADDRESSING TEST METHODS AND APPARATUSES, STORAGE MEDIA, AND ELECTRONIC DEVICES

(71) Applicant: Alipay (Hangzhou) Information Technology Co., Ltd., Hangzhou (CN)

(72) Inventor: Kun Gao, Hangzhou (CN)

(73) Assignee: Alipay (Hangzhou) Information Technology Co., Ltd., Hangzhou (CN)

( * ) Notice: Subject to any disclaimer, the term of this patent is extended or adjusted under 35 U.S.C. 154(b) by 111 days.

(21) Appl. No.: 18/969,584

(22) Filed: Dec. 5, 2024

(65) Prior Publication Data

US 2025/0097193 A1 Mar. 20, 2025

Related U.S. Application Data

(63) Continuation of application No. PCT/CN2023/110637, filed on Aug. 1, 2023.

(30) Foreign Application Priority Data

Aug. 26, 2022 (CN) ......................... 202211034234.9

(51) Int. Cl.
*H04L 61/5046* (2022.01)
*G06F 11/3668* (2025.01)
*G06F 11/3698* (2025.01)

(52) U.S. Cl.
CPC ...... *H04L 61/5046* (2022.05); *G06F 11/3684* (2013.01); *G06F 11/3688* (2013.01); *G06F 11/3698* (2025.01)

(58) Field of Classification Search
CPC ............. H04L 61/5046; G06F 11/3684; G06F 11/3698; G06F 11/3688
See application file for complete search history.

(56) References Cited

U.S. PATENT DOCUMENTS 8,954,959 B2 * 2/2015 Tsirkin ................ G06F 9/45558 718/1
9,336,103 B1 * 5/2016 Hasbe ..................... G06F 11/27
(Continued)

FOREIGN PATENT DOCUMENTS

CN 105052082 A 11/2015
CN 108616572 A 10/2018
(Continued)

OTHER PUBLICATIONS

International Preliminary Report on Patentability in International Appln. No. PCT/CN2023/110637, mailed on Mar. 13, 2025, 12 pages (with English translation).
(Continued)

*Primary Examiner* — Azizul Choudhury
(74) *Attorney, Agent, or Firm* — Fish & Richardson P.C.

(57) ABSTRACT

A computer-implemented method for addressing testing includes, applying to addressing middleware in a test cloud architecture, creating virtual middleware in response to a received creation request for the virtual middleware. In response to a configuration request for the virtual middleware, at least one actual address is selected from actual addresses of nodes as an address of the virtual middleware, and a channel is established from the virtual middleware to a user according to the address of the virtual middleware. When the addressing middleware is in test, a test case containing an addressing request used to address the virtual middleware is run. Based on attribute information of a user who sends the addressing request and the channel, an address of the virtual middleware is determined as a test address and compared with a pre-determined standard address as a test result of the addressing middleware.

20 Claims, 5 Drawing Sheets

(56) References Cited

U.S. PATENT DOCUMENTS

| | | | | |
|---|---|---|---|---|
| 2015/0180949 | A1 * | 6/2015 | Maes | G06F 9/5072 709/201 |
| 2016/0105393 | A1 | 4/2016 | Thakkar et al. | |
| 2017/0093684 | A1 | 3/2017 | Jayaraman et al. | |
| 2018/0367499 | A1 | 12/2018 | Bansal | |
| 2019/0042764 | A1 * | 2/2019 | Durham | G06F 3/0623 |
| 2022/0006701 | A1 * | 1/2022 | Patel | H04L 41/40 |
| 2023/0104568 | A1 * | 4/2023 | Miriyala | H04L 41/0813 718/104 |

FOREIGN PATENT DOCUMENTS

| | | | |
|---|---|---|---|
| CN | 109344209 | A | 2/2019 |
| CN | 109993530 | A | 7/2019 |
| CN | 112115010 | A | 12/2020 |
| CN | 113704121 | A | 11/2021 |
| CN | 115617648 | A | 1/2023 |

OTHER PUBLICATIONS

International Search Report and Written Opinion in International Appln. No. PCT/CN2023/110637, mailed on Oct. 18, 2023, 14 pages (with English translation).
Extended European Search Report in European Appln. No. 23856425.6, mailed on Aug. 6, 2025, 11 pages.

* cited by examiner

ADDRESSING TEST METHODS AND APPARATUSES, STORAGE MEDIA, AND ELECTRONIC DEVICES

CROSS-REFERENCE TO RELATED APPLICATIONS

This application is a continuation of PCT Application No. PCT/CN2023/110637, filed on Aug. 1, 2023, which claims priority to Chinese Patent Application No. 202211034234.9, filed on Aug. 26, 2022, and each application is hereby incorporated by reference in its entirety.

TECHNICAL FIELD

This application relates to the computer field, and in particular, to addressing test methods and apparatuses, storage media, and electronic devices.

BACKGROUND

With the continuous development of Internet technologies and digital economy, service forms in various industries are moving towards further openness and Internetization. To cope with elastic demands of sudden services on resources in the Internet service form, a distributed architecture gradually evolves into an elastic hybrid cloud architecture, that is, the distributed architecture is combined with cloud native.

In a cloud native era, a cloud operator provides lots of convenient and swift middleware while protecting user privacy, so as to better serve users. The users can invoke the middleware by using a standardized application programming interface (API), so as to obtain a service provided by the invoked middleware.

In addition to the middleware that provides a service for users, there is special middleware whose function is to find users for users. Therefore, whether addressing middleware can accurately locate an address of middleware that needs to be invoked is very important for users, i.e., addressing accuracy of the addressing middleware is crucial to impact of all the users, so how to test the addressing accuracy of the addressing middleware is a problem that needs to be solved urgently.

SUMMARY

This specification provides addressing test methods and apparatuses, storage media, and electronic devices, so as to at least partially alleviate the above-mentioned problems existing in a related technology.

This specification uses the following technical solutions: This specification provides an addressing test method, including: creating virtual middleware in response to a received creation request for the virtual middleware; in response to a configuration request for the virtual middleware, selecting at least one actual address from actual addresses of nodes contained in the cloud architecture as an address of the virtual middleware, and establishing a channel from the virtual middleware to a user in the cloud architecture according to the address of the virtual middleware; when the addressing middleware is in test, running a test case by using the addressing middleware, where the test case contains an addressing request used to address the virtual middleware; determining, by using the addressing middleware and based on attribute information of a user who sends the addressing request and the channel, an address of the addressed virtual middleware as a test address; and comparing the test address with a standard address to obtain a test result of the addressing middleware, where the standard address is determined in advance according to the attribute information of the user who sends the addressing request and the channel.

Optionally, the channel includes a common channel; the establishing a channel from the virtual middleware to a user in the cloud architecture specifically includes: for each address of the virtual middleware, when a common channel from the address of the virtual middleware to the user in the cloud architecture is established, configuring the address as an address corresponding to the common channel, and configuring attribute information of a user allowed to access the address for the common channel; and the attribute information includes at least one of a logical equipment room in which the user is located, a physical equipment room in which the user is located, or a geographical region in which the user is located.

Optionally, the channel includes a dedicated channel; the user in the cloud architecture includes a logic data center LDC user; the establishing a channel from the virtual middleware to a user in the cloud architecture specifically includes: for each address of the virtual middleware, when a dedicated channel from the address of the virtual middleware to the LDC user in the cloud architecture is established, configuring the address as an address corresponding to the dedicated channel, determining an LDC user who needs to establish the dedicated channel as an LDC user allowed to access the address, and configuring attribute information of the LDC user allowed to access the address for the dedicated channel; and the attribute information includes at least one of a tenant to which the LDC user belongs, a logical equipment room in which the LDC user is located, a physical equipment room in which the LDC user is located, or a geographical region in which the LDC user is located.

Optionally, the channel includes a dedicated channel; the user in the cloud architecture includes a non-logic data center LDC user; the establishing a channel from the virtual middleware to a user in the cloud architecture specifically includes: for each address of the virtual middleware, when a dedicated channel from the address of the virtual middleware to the non-LDC user in the cloud architecture is established, configuring the address as an address corresponding to the dedicated channel, determining a non-LDC user who needs to establish the dedicated channel as a non-LDC user allowed to access the address, and configuring attribute information of the non-LDC user allowed to access the address for the dedicated channel; and the attribute information includes at least one of a tenant to which the non-LDC user belongs, a physical equipment room in which the non-LDC user is located, or a geographical region in which the non-LDC user is located.

Optionally, the determining, by using the addressing middleware and based on attribute information of a user who sends the addressing request and the channel, an address of the addressed virtual middleware specifically includes: for each channel, determining, by using the addressing middleware, whether a configuration of the channel contains at least one type of attribute information of the user who sends the addressing request; if yes, determining that the channel is a channel that matches the attribute information of the user who sends the addressing request; or otherwise, determining that the channel is not a channel that matches the attribute information of the user who sends the addressing request; and determining an address corresponding to the channel that matches the attribute information of the user who sends the addressing request as the address of the addressed virtual middleware.

Optionally, after the establishing a channel from the virtual middleware to a user in the cloud architecture, the method further includes: determining an environment screening condition corresponding to the established channel; and before the determining that the channel is a channel that matches the attribute information of the user who sends the addressing request, the method further includes: determining that an environment in which the user who sends the addressing request is located satisfies the environment screening condition corresponding to the channel.

Optionally, the address of the virtual middleware includes at least two actual addresses; and the comparing the test address with a standard address to obtain a test result of the addressing middleware specifically includes: determining whether the test address obtained by addressing is in a one-to-one correspondence with the standard address; if yes, determining that an addressing result of the addressing middleware is accurate; and if no, determining that the addressing result of the addressing middleware is inaccurate.

This specification provides an addressing test apparatus, including: a creation module, configured to create virtual middleware in response to a received creation request for the virtual middleware; a configuration module, configured to: in response to a configuration request for the virtual middleware, select at least one actual address from actual addresses of nodes contained in the cloud architecture as an address of the virtual middleware, and establish a channel from the virtual middleware to a user in the cloud architecture according to the address of the virtual middleware; a running module, configured to: when the addressing middleware is in test, run a test case by using the addressing middleware, where the test case contains an addressing request used to address the virtual middleware; an addressing module, configured to determine, by using the addressing middleware and based on attribute information of a user who sends the addressing request and the channel, an address of the addressed virtual middleware as a test address; and a comparison module, configured to compare the test address with a standard address to obtain a test result of the addressing middleware, where the standard address is determined in advance according to the attribute information of the user who sends the addressing request and the channel.

Optionally, the channel includes a common channel; and the configuration module is specifically configured to: for each address of the virtual middleware, when a common channel from the address of the virtual middleware to the user in the cloud architecture is established, configure the address as an address corresponding to the common channel, and configure attribute information of a user allowed to access the address for the common channel; and the attribute information includes at least one of a logical equipment room in which the user is located, a physical equipment room in which the user is located, or a geographical region in which the user is located.

Optionally, the channel includes a dedicated channel; and the user in the cloud architecture includes a logic data center LDC user; and the configuration module is specifically configured to: for each address of the virtual middleware, when a dedicated channel from the address of the virtual middleware to the LDC user in the cloud architecture is established, configure the address as an address corresponding to the dedicated channel, determine an LDC user who needs to establish the dedicated channel as an LDC user allowed to access the address, and configure attribute information of the LDC user allowed to access the address for the dedicated channel; and the attribute information includes at least one of a tenant to which the LDC user belongs, a logical equipment room in which the LDC user is located, a physical equipment room in which the LDC user is located, or a geographical region in which the LDC user is located.

Optionally, the channel includes a dedicated channel; and the user in the cloud architecture includes a non-logic data center LDC user; the configuration module is specifically configured to: for each address of the virtual middleware, when a dedicated channel from the address of the virtual middleware to the non-LDC user in the cloud architecture is established, configuring the address as an address corresponding to the dedicated channel, determining a non-LDC user who needs to establish the dedicated channel as a non-LDC user allowed to access the address, and configuring attribute information of the non-LDC user allowed to access the address for the dedicated channel; and the attribute information includes at least one of a tenant to which the non-LDC user belongs, a physical equipment room in which the non-LDC user is located, or a geographical region in which the non-LDC user is located.

Optionally, the addressing module is specifically configured to: for each channel, determine, by using the addressing middleware, whether a configuration of the channel contains at least one type of attribute information of the user who sends the addressing request; if yes, determine that the channel is a channel that matches the attribute information of the user who sends the addressing request; or otherwise, determine that the channel is not a channel that matches the attribute information of the user who sends the addressing request; and determine an address corresponding to the channel that matches the attribute information of the user who sends the addressing request as the address of the addressed virtual middleware.

Optionally, the configuration module is further configured to: after establishing the channel from the virtual middleware to the user in the cloud architecture, determine an environment screening condition corresponding to the established channel; and the addressing module is further configured to: before determining that the channel is a channel that matches the attribute information of the user who sends the addressing request, determine that an environment in which the user who sends the addressing request is located satisfies the environment screening condition corresponding to the channel.

Optionally, the address of the virtual middleware includes at least two actual addresses; and the comparison module is specifically configured to: determine whether the test address obtained by addressing is in a one-to-one correspondence with the standard address; if yes, determine that an addressing result of the addressing middleware is accurate; and if no, determine that the addressing result of the addressing middleware is inaccurate.

This specification provides a computer-readable storage medium. The storage medium stores a computer program, and when the computer program is executed by a processor, the addressing test method is implemented.

This specification provides an electronic device, including a memory, a processor, and a computer program that is stored in the memory and that is capable of running on the processor. When the processor executes the computer program, the addressing test method is implemented.

The above-mentioned at least one technical solution used in this specification can achieve the following beneficial effects: In the addressing test method provided in this specification, virtual middleware is created according to an actual address in a cloud architecture, and a channel from the virtual middleware to a user in the cloud architecture is established according to an address of the virtual middleware. The address of the addressed virtual middleware is determined as a test address by using addressing middleware and based on attribute information of a user who sends an addressing request and the channel. According to the attribute information of the user who sends the addressing request and the channel, a standard address is determined, and the test address is compared with the standard address to obtain a test result of the addressing middleware, thereby completing testing of the addressing middleware.

It can be understood from the above-mentioned method that, in the method, an actual node is obtained to simulate a channel between middleware in a cloud architecture and a user, and an addressing result of addressing middleware is accurately tested. In addition, the method is not limited to an actual application scenario, and can be arbitrarily extended, that is, accuracy is ensured, and costs are reduced.

BRIEF DESCRIPTION OF DRAWINGS

The accompanying drawings described here are used to provide a further understanding of this specification, and constitute a part of this specification. Example embodiments of this specification and descriptions of the embodiments are used to explain this specification, and do not constitute an inappropriate limitation on this specification. In the accompanying drawings.

DESCRIPTION OF EMBODIMENTS

To make the objectives, technical solutions, and advantages of this specification clearer, the following clearly and comprehensively describes the technical solutions of this specification with reference to specific embodiments of this specification and corresponding accompanying drawings. It is clear that the described embodiments are merely some but not all of embodiments of this specification. All other implementations obtained by a person of ordinary skill in the art based on the implementations of this specification without creative efforts shall fall within the protection scope of this application.

The technical solutions provided in the embodiments of this specification are described in detail below with reference to the accompanying drawings.

Figure 1:
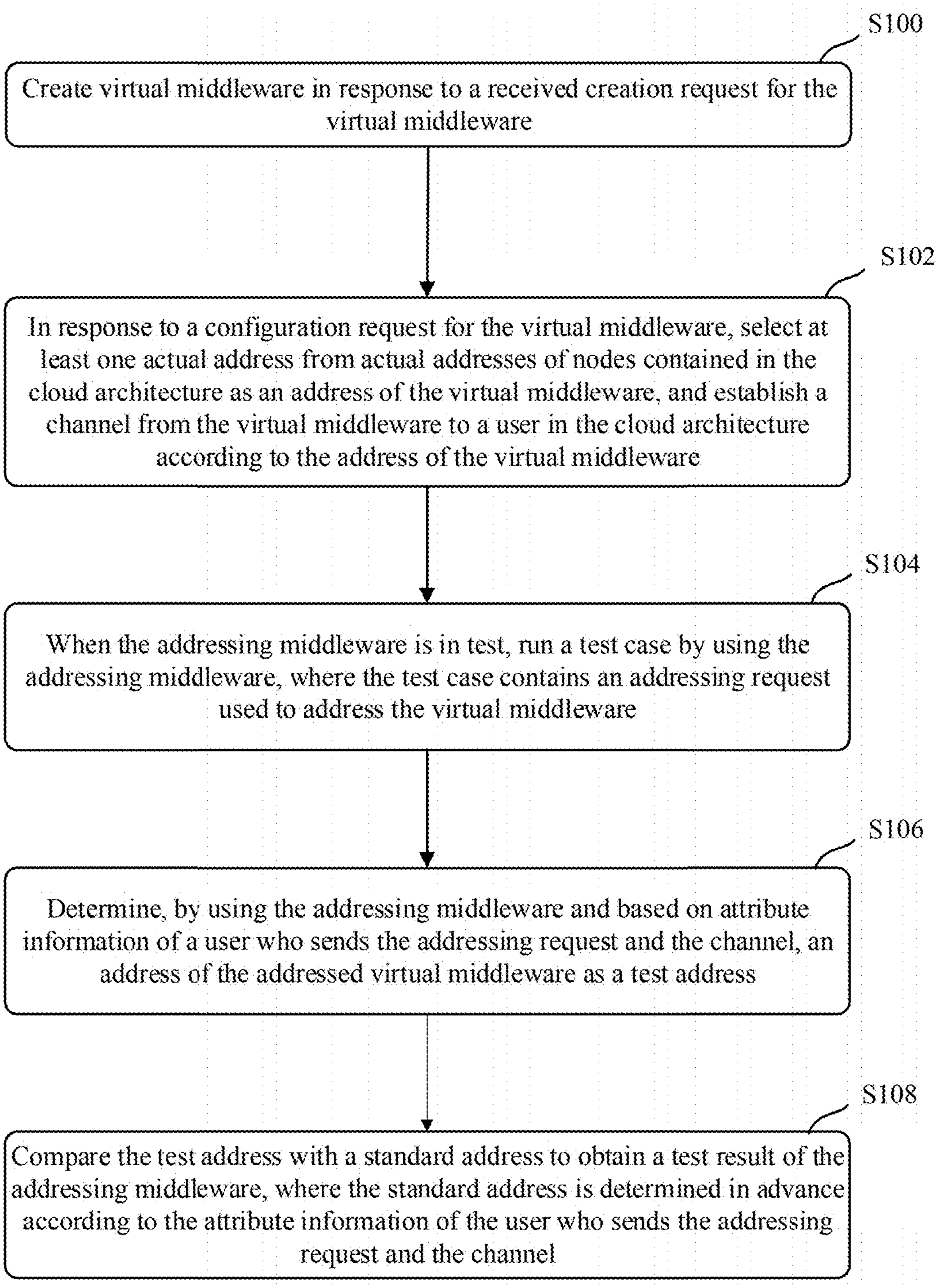
FIG. 1 is a schematic flowchart illustrating an addressing test method, according to this specification.

FIG. 1 is a schematic flowchart illustrating an addressing test method, according to this specification, and specifically includes the following steps S100 to S108.

S100: Create virtual middleware in response to a received creation request for the virtual middleware.

In order not to affect normal running of actual middleware to provide a service for a user, the virtual middleware can be created before an addressing test. The so-called middleware is independent system software or service program that connects two independent applications or independent system software, and is configured to manage computer resources and network communication. Distributed application software shares resources between different technologies by using the software. The virtual middleware created in this embodiment of this specification is middleware created according to an actual node in a cloud architecture, and does not actually provide a service for a user, but has an actual address, which is used to test addressing accuracy of addressing middleware.

Specifically, a creation request used to create virtual middleware can be sent to a central control region in the cloud architecture. The central control region creates virtual middleware in response to the request for creating virtual middleware, and simulates actual middleware to be used for an addressing test.

In addition, before a test is conducted, data unrelated to this test and not affecting running of the actual middleware can be cleaned, and the unrelated data may have been generated by a previous test. Cleaning the unrelated data before the test is conducted can prevent the unrelated data from affecting a test result, thus causing inaccuracy of the test result.

S102: In response to a configuration request for the virtual middleware, select at least one actual address from actual addresses of nodes contained in the cloud architecture as an address of the virtual middleware, and establish a channel from the virtual middleware to a user in the cloud architecture according to the address of the virtual middleware.

After the virtual middleware is created in the central control region in step S100, although the virtual middleware does not actually provide a service for a user, the virtual middleware necessarily has an address; otherwise, the virtual middleware cannot be used for an addressing test. Therefore, after creating the virtual middleware, the central control region further needs to configure the address of the virtual middleware.

Figure 2:
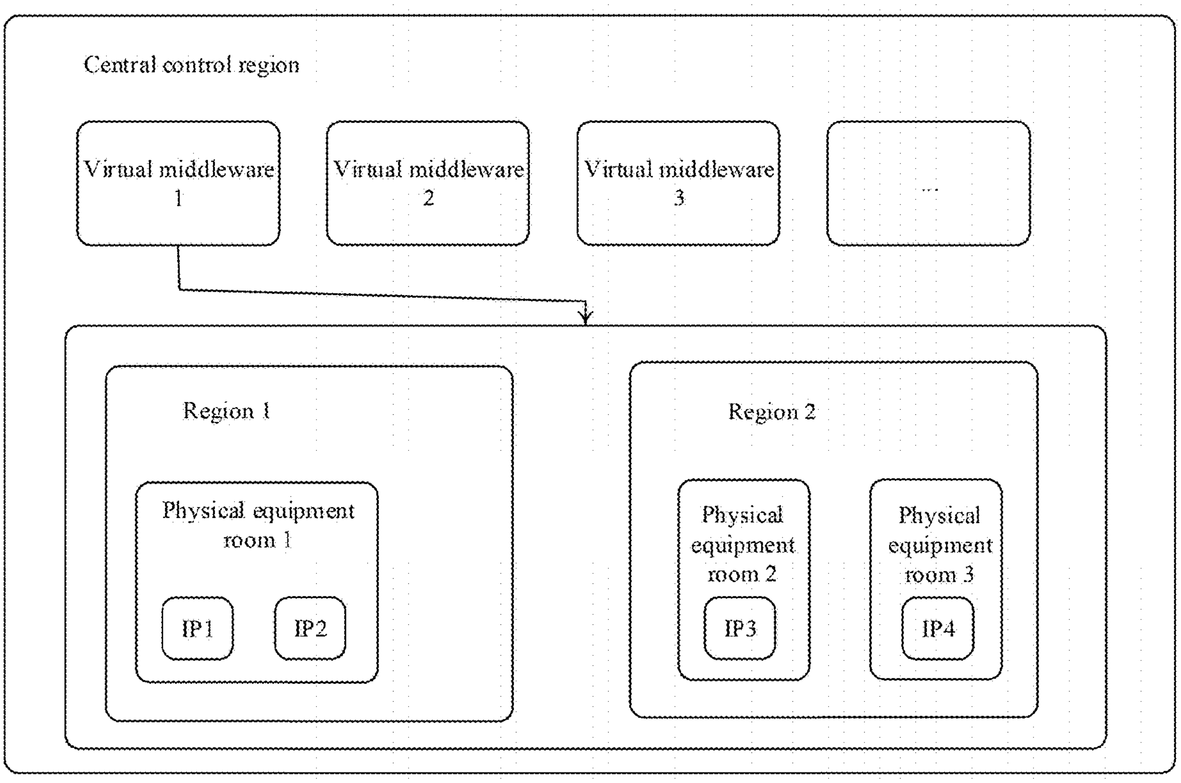
FIG. 2 is a schematic diagram illustrating allocation of an actual address to virtual middleware, according to this specification.

To ensure authenticity of the test, the address allocated by the central control region to the virtual middleware is selected from the actual addresses of the nodes contained in the cloud architecture, and at least one actual address is selected as the address of the virtual middleware. The address can be an Internet Protocol (IP) address. After obtaining an IP address of a piece of middleware, the user can access the middleware to obtain a service by using the IP address of the middleware. As shown in FIG. 2, multiple pieces of virtual middleware including virtual middleware 1 to virtual middleware 3 are created. For the virtual middleware 1, four actual addresses can be selected to be configured as addresses of the virtual middleware 1. The four actual addresses are respectively IP1 and IP2 of nodes in physical equipment room 1 in region 1, and IP3 and IP4 of nodes in physical equipment room 2 in region 2.

Figure 3:
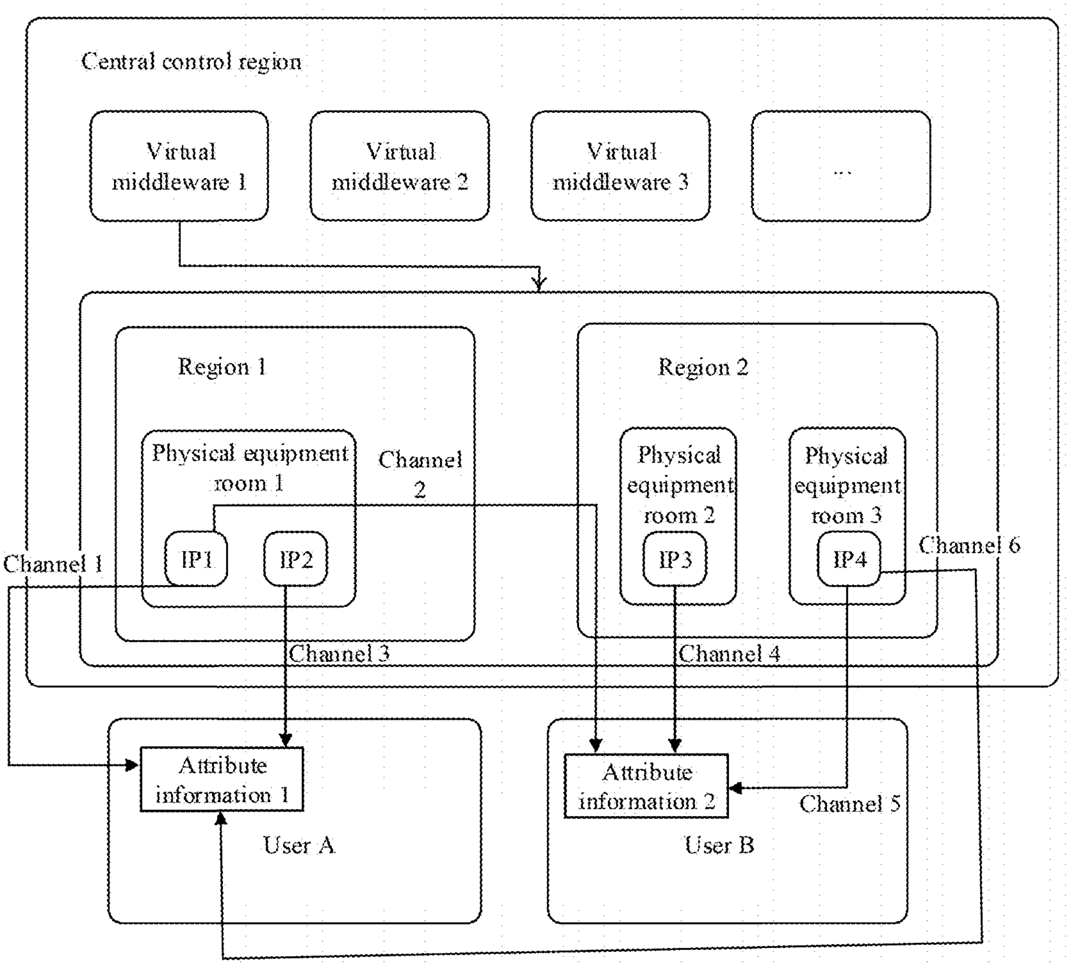
FIG. 3 is a schematic diagram illustrating configuration-completed virtual middleware, according to this specification.

After the virtual middleware has an address, it is also necessary to simulate addressing logic of the addressing middleware to establish a channel between the virtual middleware and a user for an addressing test. Therefore, after the actual address is allocated to the virtual middleware, the central control region further needs to establish a channel from the virtual middleware to the user in the cloud architecture, and an established channel is shown in FIG. 3. The central control region establishes a channel 1, a channel 2, and a channel 3 from the virtual middleware 1 to a user A in the cloud architecture, and the central control region establishes a channel 4, a channel 5, and a channel 6 from the virtual middleware 1 to a user B in the cloud architecture. A channel is a correspondence between middleware and a user. Establishing a channel is to establish a correspondence between an address of middleware and attribute information of a user who satisfies a condition. As shown in FIG. 3, the channel 1 is a correspondence between the address IP1 of the virtual middleware 1 and attribute information 1 of the user A, the channel 2 is a correspondence between the address IP1 of the virtual middleware 1 and attribute information 2 of the user B, the channel 3 is a correspondence between the address IP2 of the virtual middleware 1 and the attribute information 1 of the user A, the channel 4 is a correspondence between the address IP3 of the virtual middleware 1 and the attribute information 2 of the user B, the channel 5 is a correspondence between the address IP4 of the virtual middleware 1 and the attribute information 2 of the user B, and the channel 6 is a correspondence between the address IP4 of the virtual middleware 1 and the attribute information 1 of the user A. By using a correspondence between an address of middleware and attribute information of a user who satisfies a condition, the addressing middleware can obtain, by using the attribute information of the user, the address of the middleware corresponding to the attribute information, so as to achieve an addressing purpose.

S104. When the addressing middleware is in test, run a test case by using the addressing middleware, where the test case contains an addressing request used to address the virtual middleware.

After the virtual middleware is created in advance by using the above-mentioned S100 and S102 and the address and the channel of the virtual middleware are configured, the addressing middleware can be tested based on the above-mentioned configured virtual middleware.

Specifically, before the addressing middleware is tested, a test case can be created first. The test case contains at least an addressing request for addressing the virtual middleware by a user. In addition, the test case can further include a user identifier of a user who sends the addressing request, or can contain attribute information of the user who sends the addressing request.

In a test process, the central control region can run the test case by using the addressing middleware, and the addressing middleware can obtain the address of the virtual middleware by using the following step S106.

S106. Determine, by using the addressing middleware and based on attribute information of a user who sends the addressing request and the channel, an address of the addressed virtual middleware as a test address.

When the created test case contains the addressing request sent by the user and the attribute information of the user who sends the addressing request, the addressing middleware can obtain the attribute information of the user after running the test case. Therefore, the addressing middleware can query, according to the channel (that is, a correspondence between the address of the middleware and the attribute information of the user who satisfies the condition) configured for the virtual middleware in step S102, the IP address of the virtual middleware corresponding to the attribute information of the user, and use the obtained IP address of the virtual middleware as the test address.

When the created test case contains the addressing request sent by the user and the user identifier of the user who sends the addressing request, after running the test case, the addressing middleware can search for the attribute information of the user according to the user identifier of the user, and after finding the attribute information of the user, the addressing middleware can query, according to the channel configured for the virtual middleware in step S102, the IP address of the virtual middleware corresponding to the attribute information of the user, and use the obtained IP address of the virtual middleware as the test address.

S108. Compare the test address with a standard address to obtain a test result of the addressing middleware, where the standard address is determined in advance according to the attribute information of the user who sends the addressing request and the channel.

In the embodiment of this specification, after the IP address and the channel of the virtual middleware are configured in the above-mentioned step 102, the address of the virtual middleware corresponding to the attribute information of the user in the test case can be manually determined, and the address is a standard address. After obtaining the test address in step S106, the addressing middleware can directly compare the obtained test address with the standard address. If the two are the same, it indicates that an addressing result of the addressing middle ware is accurate; otherwise, it indicates that the addressing result of the addressing middleware is inaccurate.

If the address of the virtual middleware includes at least two actual addresses, it can be determined whether the test address obtained through addressing is in a one-to-one correspondence with the standard address; if yes, it is determined that the addressing result of the addressing middleware is accurate; or if no, it is determined that the addressing result of the addressing middleware is inaccurate.

For example, as shown in FIG. 3, the user A needs to search for the address of the virtual middleware 1. Actual node IP addresses of the virtual middleware 1 are IP1, IP2, IP3, and IP4. According to the preconfigured channel, it can be determined that the standard address is IP1, IP2, and IP4. In this case, if addresses addressed by the addressing middleware according to the attribute information of the user A and the channel between the user A and the virtual middleware 1 are IP1, IP2, and IP4, it indicates that the test result is accurate. Otherwise, assume that only one or two of IP1, IP2, and IP4 are addressed by the addressing middleware, and even no address is addressed, or the addressed test result includes IP4, it indicates that the addressing result of the addressing middleware is inaccurate.

Optionally, after the test is completed, test data used to test the addressing middleware can be further cleaned, so as to prevent impact on another operation. For example, the virtual middleware created in the central control region and the address and the channel configured for the virtual middleware in step S100 and step S102 can be cleaned, or the test case created in step S104 can be cleaned, or the test address and the standard address determined in step S106 and step S108 can be cleaned.

It can be understood from the above-mentioned method that, in the method, an actual node is obtained to simulate a channel between middleware in a cloud architecture and a user, and an addressing result of addressing middleware is accurately tested. In addition, the method is not limited to an actual application scenario, and can be arbitrarily extended. Because the middleware used for testing in this method is virtual middleware temporarily created, any quantity of virtual middleware can be created according to a test need, or any type of virtual middleware can be created, and an address and a channel of the virtual middleware can be arbitrarily configured. The virtual middleware and the address and the channel of the virtual middleware do not affect running of actual middleware and can smoothly perform testing, which ensures test accuracy and reduces costs.

In the above-mentioned step S102, the central control region configures the created virtual middleware, and establishes the channel (that is, the correspondence between the address of the middleware and the attribute information of the user who satisfies the condition) from the virtual middleware to the user in the cloud architecture after the actual address is allocated to the virtual middleware. In practice, if types of established channels are the same, the addressing middleware can implement a basic addressing function, but correspondingly, addressing efficiency of the addressing middleware is relatively low.

In practice, because the cloud service provider provides services for many different tenants, different tenants need to be distinguished, and distinguishing different tenants is identified as tenant isolation. Tenant isolation means that a behavior of one tenant operating a cloud computing resource cannot be perceived by another tenant. Users can be divided into a logic data center (LDC) tenant and a non-logic data center (LDC) tenant according to different conditions of tenant isolation. A difference between the two is that, in the case of the non-LDC tenant, a physical equipment room of the user is a necessary condition for tenant isolation, whereas in the case of the LDC tenant, tenants can be isolated by using logical equipment rooms of the users. The physical equipment room is an actual equipment room, where many hosts are stored. The cloud service provider provides its own cloud resources to the user. The logical equipment room is essentially logical division of the physical equipment room. One or more larger physical equipment rooms are assumed to be more smaller equipment rooms, and logical division of the physical equipment room is implemented through zone grouping.

For users of the above-mentioned different tenant types, if established channels between virtual middleware and users are the same, a case may occur in which users of different tenant types are queued to access the same channel, and addressing efficiency of the addressing middleware is relatively low. If the channels are classified, users of different types can obtain addresses by accessing different channels when addressing by using the addressing middleware, thereby improving addressing efficiency of the addressing middleware. To improve the addressing efficiency of the addressing middleware, optionally, established channels can be classified into two types: a common channel and a dedicated channel.

A channel directly established by the central control region for virtual middleware is named a common channel, and a channel from virtual middleware to a user created by the central control region in response to a channel establishment request of the user who needs to use the virtual middleware is named a dedicated channel. An establishment process can be specifically as follows:

A process of establishing a common channel from the virtual middleware to the user in the cloud architecture specifically includes:

for each address of the virtual middleware, when a common channel from the address of the virtual middleware to the user in the cloud architecture is established, configuring the address as an address corresponding to the common channel, and configuring attribute information of a user allowed to access the address for the common channel; and the attribute information includes at least one of a logical equipment room in which the user is located, a physical equipment room in which the user is located, or a geographical region in which the user is located.

Dedicated channels are divided into a dedicated channel for an LDC tenant and a dedicated channel for a non-LDC tenant according to different tenant types to which users belong.

For the dedicated channel of the LDC tenant, an establishment process specifically includes: for each address of the virtual middleware, when a dedicated channel from the address of the virtual middleware to the LDC tenant in the cloud architecture is established, configuring the address as an address corresponding to the dedicated channel, determining an LDC tenant who needs to establish the dedicated channel as an LDC tenant allowed to access the address, and configuring attribute information of the LDC tenant allowed to access the address for the dedicated channel; and the attribute information includes at least one of a tenant to which the LDC tenant belongs, a logical equipment room in which the LDC tenant is located, a physical equipment room in which the LDC tenant is located, or a geographical region in which the LDC tenant is located.

For the dedicated channel of the non-LDC tenant, an establishment process specifically includes: for each address of the virtual middleware, when a dedicated channel from the address of the virtual middleware to the non-LDC tenant in the cloud architecture is established, configuring the address as an address corresponding to the dedicated channel, determining a non-LDC tenant who needs to establish the dedicated channel as a non-LDC tenant allowed to access the address, and configuring attribute information of the non-LDC tenant allowed to access the address for the dedicated channel; and the attribute information includes at least one of a tenant to which the non-LDC tenant belongs, a physical equipment room in which the non-LDC tenant is located, or a geographical region in which the non-LDC tenant is located.

Figure 4:
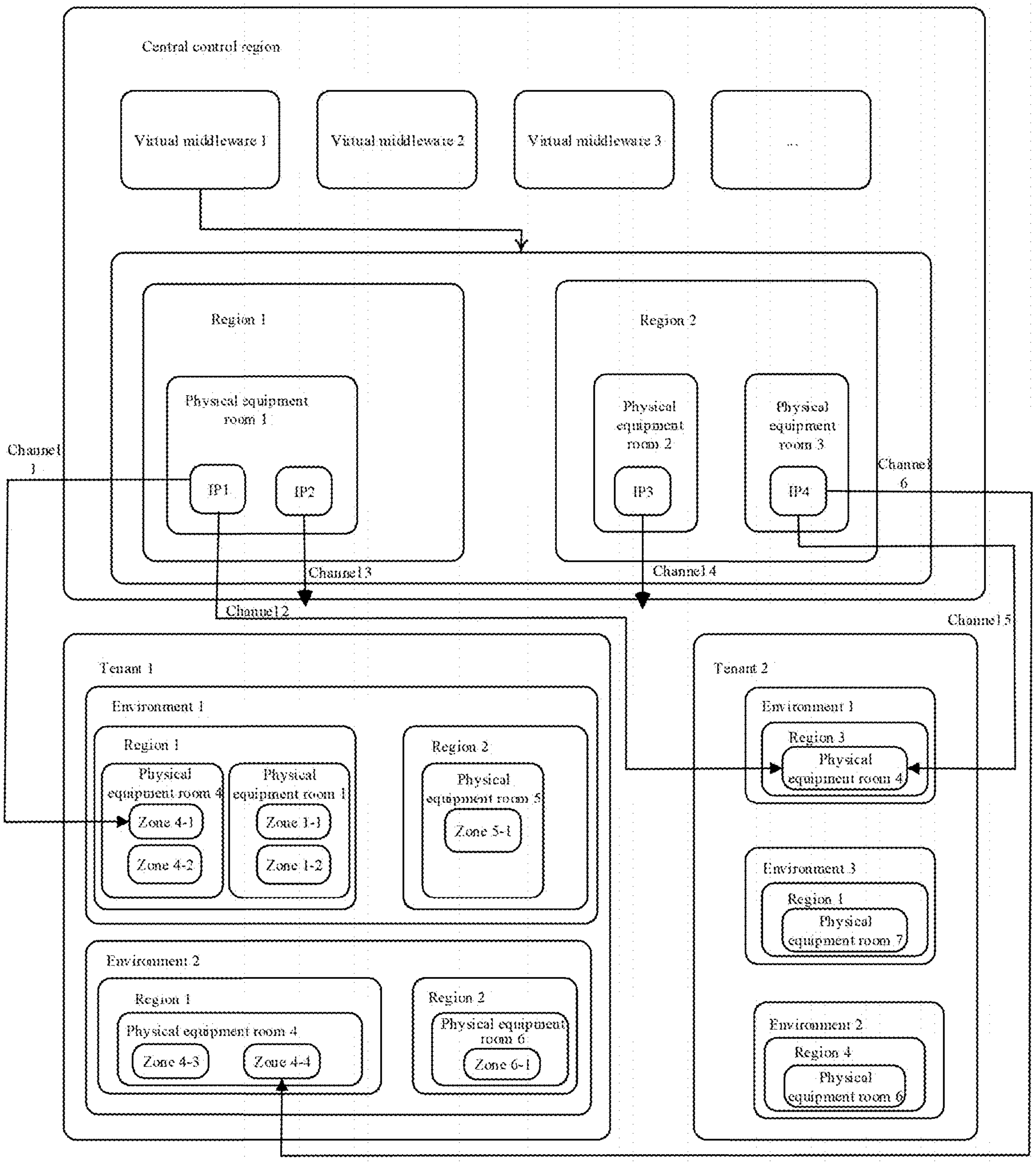
FIG. 4 is a schematic diagram illustrating establishment of a channel, according to this specification.

Specifically, as shown in FIG. 4, as described in steps S100 and S102, the central control region creates the virtual middleware 1, and allocates IP addresses (IP1 to IP4) to the virtual middleware 1, where the tenant 1 is an LDC tenant, and the tenant 2 is a non-LDC tenant. IP1 to IP4 are configured as follows: Channel 1: The channel 1 between the virtual middleware 1 and a user belonging to the tenant 1 is configured as a dedicated channel for an LDC tenant; and one logical equipment room (that is, a zone 4-1) of the tenant 1, a physical equipment room 4, a region 1, and the tenant 1 are configured as attribute information of a user allowed by the channel 1 to access IP1. Channel 2: The channel 2 between the virtual middleware 1 and a user belonging to the tenant 2 is configured as a dedicated channel for a non-LDC tenant; and one physical equipment room (physical equipment room 4) of the tenant 2, a region 3, and the tenant 2 are configured as attribute information of a user allowed by the channel 2 to access IP1. Channel 3: The channel 3 between virtual middleware 1 and a user belonging to the tenant 1 is configured as a common channel, IP2 is configured as an address corresponding to the channel 3, and attribute information of a user allowed to access the address is configured for the channel 3 as a physical equipment room 1, the tenant 1 or the tenant 2, and the region 1. Channel 4: The channel 4 between virtual middleware 1 and a user belonging to the tenant 2 is configured as a common channel, IP3 is configured as an address corresponding to the channel 4, and attribute information of a user allowed to access the address is configured for the channel 4 as the physical equipment room 1, the tenant 1 or the tenant 2, and the region 1. Channel 5: The channel 5 between the virtual middleware 1 and a user belonging to the tenant 2 is configured as a dedicated channel for a non-LDC tenant; and one physical equipment room (physical equipment room 4) of the tenant 2, the region 3, and the tenant 2 are configured as attribute information of a user allowed by the channel 5 to access IP4.

Channel 6: The channel 6 between the virtual middleware 1 and a user belonging to the tenant 1 is configured as a dedicated channel for an LDC tenant; and one logical equipment room (zone 4-4) of the tenant 1, a physical equipment room 4, the region 1, and the tenant 1 are configured as attribute information of a user allowed by the channel 6 to access IP4.

For the channel in the above-mentioned example, a corresponding addressing logic is as follows: for each channel, determining, by using the addressing middleware, whether a configuration of the channel contains at least one type of attribute information of the user who sends the addressing request; if yes, determining that the channel is a channel that matches the attribute information of the user who sends the addressing request; or otherwise, determining that the channel is not a channel that matches the attribute information of the user who sends the addressing request; and determining an address corresponding to the channel that matches the attribute information of the user who sends the addressing request as the address of the addressed virtual middleware.

It is worthwhile to note that the common channel is a channel directly created by the cloud provider for the virtual middleware, that is, the cloud service provider directly configures, for the common channel, attribute information of a user allowed to access the address of the virtual middleware. If a user wants to access the common channel to obtain the address of the virtual middleware corresponding to the common channel, the cloud service provider determines whether a configuration of the common channel contains at least one type of attribute information of the user who sends the addressing request. If yes, the user can access the common channel to obtain the address of the virtual middleware; otherwise, the user cannot access the common channel to obtain the address of the virtual middleware. The dedicated channel is a channel between a user and virtual middleware established by the cloud service provider for the user who needs to create a channel between the user and the virtual middleware. The cloud service provider configures attribute information of the user who needs to create the channel as attribute information of a user allowed by the dedicated channel to access an address of the virtual middleware. If another user wants to access the dedicated channel to obtain the address of the virtual middleware corresponding to the dedicated channel, the cloud service provider determines whether a configuration of the common channel contains at least one type of attribute information of the user who sends the addressing request, that is, whether the attribute information of the user who creates the dedicated channel contains at least one type of attribute information of the user who sends the addressing request. If yes, the user can access the common channel to obtain the address of the virtual middleware; otherwise, the user cannot access the common channel to obtain the address of the virtual middleware.

The above-mentioned example continues to be used. Specifically, as shown in FIG. 4, a tenant to which the user A belongs is the tenant 1, a tenant to which the user B belongs is the tenant 2, attribute information of the user A is the zone 1-1 (that is, a logical equipment room to which the user B belongs), the physical equipment room 1, the region 1, and the tenant 1, and attribute information of the user B is a physical equipment room 7, the region 1, and the tenant 2.

For each user, specific addressing is as follows:

User A: Send a request for addressing the virtual middleware 1.

For the channel 1, the addressing middleware determines that a type of the channel 1 is a dedicated channel, determines that the logical equipment room (zone 1-1) in the attribute information of the user A is different from attribute information of a user allowed by the channel 1 to access IP1, continues to determine that the physical equipment room 1 in the attribute information of the user A is different from the attribute information of the user allowed by the channel 1 to access IP1, and continues to determine that the region 1 in the attribute information of the user A is the same as the attribute information of the user allowed by the channel 1 to access IP1, and therefore, returns IP1 to the user A. For the channel 3, the addressing middleware determines that a type of the channel 3 is a common channel, and determines that the physical equipment room 1 in the attribute information of the user A is the same as attribute information of a user allowed by the channel 3 to access IP2, and therefore returns IP2 to the user A. For the channel 6, the addressing middleware determines that a type of the channel 6 is a dedicated channel, determines that a logical equipment room (zone 1-1) in the attribute information of the user A is different from attribute information of a user allowed by the channel 6 to access IP4, continues to determine that the physical equipment room 1 in the attribute information of the user A is different from the attribute information of the user allowed by the channel 6 to access IP4, and continues to determine that the region 1 in the attribute information of the user A is the same as the attribute information of the user allowed by the channel 6 to access IP4, and therefore, returns IP4 to the user A.

User B: Send a request for addressing the virtual middleware 1.

For the channel 2, the addressing middleware determines that a type of the channel 2 is a common channel, determines that the physical equipment room 7 in attribute information of the user B is different from attribute information of a user allowed by the channel 2 to access IP1, continues to determine that the region 1 in the attribute information of the user B is different from the attribute information of the user allowed by the channel 2 to access IP1, and continues to determine that the tenant 2 in the attribute information of the user B is the same as the attribute information of the user allowed by the channel 2 to access IP1, and therefore returns IP1 to the user B. For the channel 4, the addressing middleware determines that a type of the channel 4 is a common channel, determines that the physical equipment room 7 in the attribute information of the user B is different from attribute information of a user allowed by the channel 4 to access IP3, continues to determine that the region 1 in the attribute information of the user B is the same as the attribute information of the user allowed by the channel 4 to access IP3, and therefore returns IP3 to the user B. For the channel 5, the addressing middleware determines that a type of the channel 5 is a dedicated channel, determines that the physical equipment room 7 in the attribute information of the user B is different from attribute information of a user allowed by the channel 5 to access IP4, continues to determine that the region 1 in the attribute information of the user B is different from the attribute information of the user allowed by the channel 5 to access IP4, and continues to determine that the tenant 2 in the attribute information of the user B is the same as the attribute information of the user allowed by the channel 5 to access IP4, and therefore returns IP4 to the user B.

Optionally, after the channel from the virtual middleware to the user in the cloud architecture is established, the method further includes: determining an environment screening condition corresponding to the established channel. Before it is determined that the channel is a channel that matches the attribute information of the user who sends the addressing request, the method further includes: determining that an environment in which the user who sends the addressing request is located satisfies the environment screening condition corresponding to the channel.

The environment refers to different production links in which different users belonging to the same tenant are located. For example, a user C, a user D, a user E, and a user F all belong to the same tenant. However, a production link in which the user C is located is development, a production link in which the user D and the user F are located is test, and a production link in which the user E is located is operation and maintenance. Then, the user D and the user F belong to the same environment. The user C and other users (the users D to F) do not belong to the same environment, and the user E and other users (the users C, D, and F) do not belong to the same environment. Correspondingly, if an environment corresponding to a channel is test, the user D and the user F belong to the same environment as the channel, and the user C and the user E belong to different environments from the channel.

The environment screening condition means that only when a user who sends an addressing request and a channel accessed through addressing are in the same environment, it can be determined that the channel matches attribute information of the user who sends the addressing request; and if the user who sends the addressing request is in a different environment from the channel accessed through addressing, it cannot be determined that the channel matches the attribute information of the user who sends the addressing request.

Optionally, after the virtual middleware is created and the virtual middleware is configured in the above-mentioned steps S100 and S102, a test case is created based on the configuration in the above-mentioned step S104. The central control region can run the test case by using the addressing middleware, and the addressing middleware can obtain the address of the virtual middleware by using step S106. Before step S106 is performed, it can be determined whether the environment in which the user who sends the addressing request is located satisfies the environment screening condition corresponding to the channel. If the condition is satisfied, step S106 continues to be performed. If the condition is not satisfied, it is determined that the channel does not match the attribute information of the user who sends the addressing request. Or after step S106 is performed, if the configuration of the channel contains at least one type of attribute information of the user who sends the addressing request, it is further determined whether the environment in which the user who sends the addressing request is located satisfies the environment screening condition corresponding to the channel; if the condition is satisfied, it is determined that the channel matches the attribute information of the user who sends the addressing request; or if the condition is not satisfied, it is determined that the channel does not match the attribute information of the user who sends the addressing request.

After channels that match the attribute information of the users A to C are determined, the address of the middleware can be determined as the test address. Finally, the test address is compared with the standard address to complete the test.

The above-mentioned description is the addressing test method provided in one or more embodiments of this specification. Based on the same idea, this specification further provides a corresponding addressing test apparatus, as shown in FIG. 4.

Figure 5:
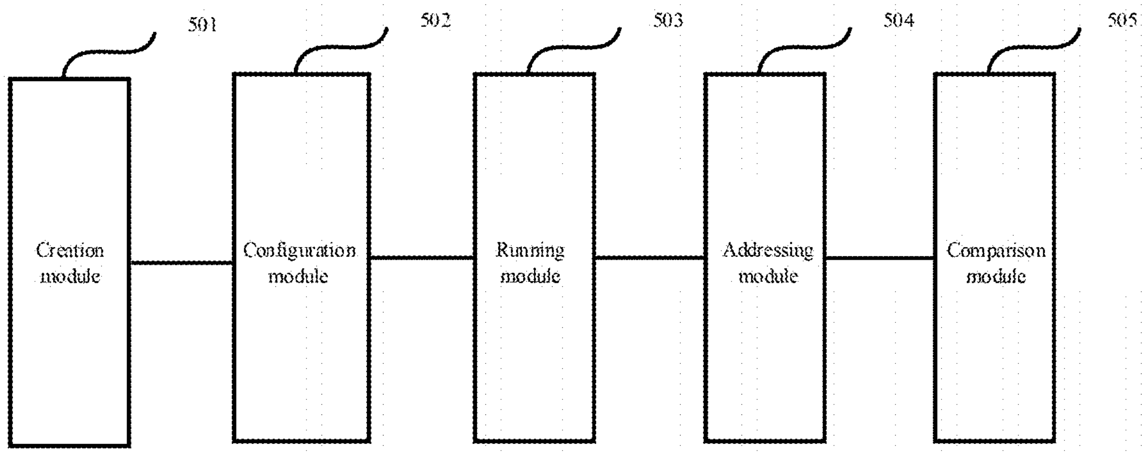
FIG. 5 is a schematic diagram illustrating an addressing test apparatus, according to this specification.

FIG. 5 is a schematic diagram illustrating an addressing test apparatus, according to this specification, specifically including: a creation module 501, configured to create virtual middleware in response to a received creation request for the virtual middleware; a configuration module 502, configured to: in response to a configuration request for the virtual middleware, select at least one actual address from actual addresses of nodes contained in the cloud architecture as an address of the virtual middleware, and establish a channel from the virtual middleware to a user in the cloud architecture according to the address of the virtual middleware; a running module 503, configured to: when the addressing middleware is in test, run a test case by using the addressing middleware, where the test case contains an addressing request used to address the virtual middleware; an addressing module 504, configured to determine, by using the addressing middleware and based on attribute information of a user who sends the addressing request and the channel, an address of the addressed virtual middleware as a test address; and a comparison module 505, configured to compare the test address with a standard address to obtain a test result of the addressing middleware, where the standard address is determined in advance according to the attribute information of the user who sends the addressing request and the channel.

Optionally, the channel includes a common channel; and the configuration module 502 is specifically configured to: for each address of the virtual middleware, when a common channel from the address of the virtual middleware to the user in the cloud architecture is established, configure the address as an address corresponding to the common channel, and configure attribute information of a user allowed to access the address for the common channel; and the attribute information includes at least one of a logical equipment room in which the user is located, a physical equipment room in which the user is located, or a geographical region in which the user is located.

Optionally, the channel includes a dedicated channel; and the user in the cloud architecture includes a logic data center LDC user; and the configuration module 502 is configured to: for each address of the virtual middleware, when a dedicated channel from the address of the virtual middleware to the LDC user in the cloud architecture is established, configure the address as an address corresponding to the dedicated channel, determine an LDC user who needs to establish the dedicated channel as an LDC user allowed to access the address, and configure attribute information of the LDC user allowed to access the address for the dedicated channel; and the attribute information includes at least one of a tenant to which the LDC user belongs, a logical equipment room in which the LDC user is located, a physical equipment room in which the LDC user is located, or a geographical region in which the LDC user is located.

Optionally, the channel includes a dedicated channel; and the user in the cloud architecture includes a non-logic data center LDC user; the configuration module 502 is specifically configured to: for each address of the virtual middleware, when a dedicated channel from the address of the virtual middleware to the non-LDC user in the cloud architecture is established, configuring the address as an address corresponding to the dedicated channel, determining a non-LDC user who needs to establish the dedicated channel as a non-LDC user allowed to access the address, and configuring attribute information of the non-LDC user allowed to access the address for the dedicated channel; and the attribute information includes at least one of a tenant to which the non-LDC user belongs, a physical equipment room in which the non-LDC user is located, or a geographical region in which the non-LDC user is located.

Optionally, the addressing module 504 is specifically configured to: for each channel, determine, by using the addressing middleware, whether a configuration of the channel contains at least one type of attribute information of the user who sends the addressing request; if yes, determine that the channel is a channel that matches the attribute information of the user who sends the addressing request; or otherwise, determine that the channel is not a channel that matches the attribute information of the user who sends the addressing request; and determine an address corresponding to the channel that matches the attribute information of the user who sends the addressing request as the address of the addressed virtual middleware.

Optionally, the configuration module 502 is further configured to: after establishing the channel from the virtual middleware to the user in the cloud architecture, determine an environment screening condition corresponding to the established channel; and the addressing module 504 is further configured to: before determining that the channel is a channel that matches the attribute information of the user who sends the addressing request, determine that an environment in which the user who sends the addressing request is located satisfies the environment screening condition corresponding to the channel.

Optionally, the address of the virtual middleware includes at least two actual addresses; and the comparison module 505 is specifically configured to: determine whether the test address obtained by addressing is in a one-to-one correspondence with the standard address; if yes, determine that an addressing result of the addressing middleware is accurate; and if no, determine that the addressing result of the addressing middleware is inaccurate.

This specification further provides a computer-readable storage medium, where the storage medium stores a computer program, and the computer program can be used to perform the above-mentioned addressing test method provided in FIG. 1.

Figure 6:
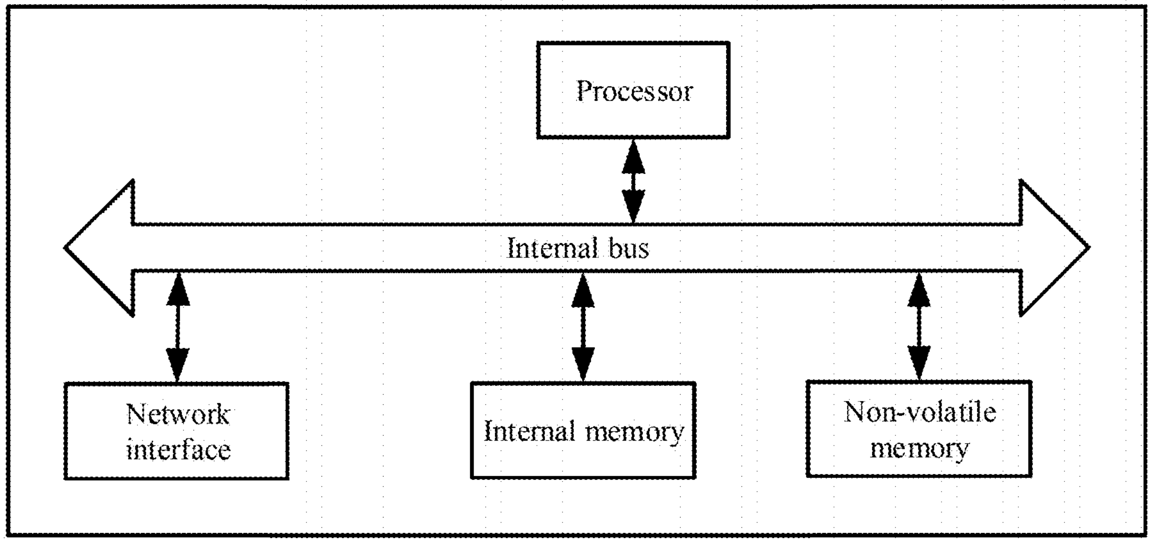
FIG. 6 is a schematic diagram illustrating an electronic device corresponding to FIG. 1, according to this specification.

This specification further provides a schematic structural diagram of an electronic device shown in FIG. 6. As shown in FIG. 6, in terms of hardware, the unmanned device includes a processor, an internal bus, a network interface, an internal memory, and a nonvolatile memory, and certainly may further include hardware needed by another service. The processor reads a corresponding computer program from the non-volatile memory to the internal memory and then runs the computer program to implement the above-mentioned addressing test method shown in FIG. 1. Certainly, in addition to a software implementation, this specification does not rule out another implementation, for example, a logic component or a combination of software and hardware. To be specific, an execution body of the following processing procedure is not limited to each logical unit, and can be hardware or a logical component.

In the 1990s, whether a technical improvement is a hardware improvement (for example, an improvement to a circuit structure, such as a diode, a transistor, or a switch) or a software improvement (an improvement to a method procedure) can be clearly distinguished. However, with development of technologies, improvement to many existing method procedures can be considered as direct improvement to hardware circuit structures. A designer usually programs an improved method procedure to a hardware circuit, to obtain a corresponding hardware circuit structure. Therefore, a method procedure can be improved by using a hardware entity module. For example, a programmable logic device (Programmable Logic Device, PLD) (for example, a field programmable gate array (Field Programmable Gate Array, FPGA)) is such an integrated circuit, and a logical function of the programmable logic device is determined by programming a component by a user. The designer independently performs programming to "integrate" a digital system to a PLD without requesting a chip manufacturer to design and manufacture an application-specific integrated circuit chip. In addition, at present, instead of manually manufacturing an integrated circuit chip, such programming is mostly implemented by using "logic compiler" software. The "logic compiler" software is similar to a software compiler used to develop and write a program. Original code needs to be written in a particular programming language before being compiled. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). At present, the Very-High-Speed Integrated Circuit Hardware Description Language (VHDL) and Verilog are most commonly used. It should also be clear to a person skilled in the art that a hardware circuit for implementing a logical method procedure can be easily obtained by performing slight logic programming on the method procedure by using the above-mentioned several hardware description languages and programming the method procedure into an integrated circuit.

The controller can be implemented in any suitable manner. For example, the controller can be in a form of a microprocessor or a processor and a computer-readable medium storing computer-readable program code (for example, software or firmware) that can be executed by the (micro) processor, a logic gate, a switch, an application-specific integrated circuit (Application-Specific Integrated Circuit, ASIC), a programmable logic controller, and an embedded microcontroller. Examples of the controller include but are not limited to the following microcontrollers: ARC 625D, Atmel AT91SAM, Microchip PIC18F26K20, and Silicone Labs C8051F320. A storage controller can further be implemented as a part of control logic of a storage. A person skilled in the art also knows that, in addition to implementing the controller by using only computer-readable program code, logic programming can be performed on a method step, so the controller implements a same function in a form of a logic gate, a switch, an application-specific integrated circuit, a programmable logic controller, an embedded microcontroller, etc. Therefore, the controller can be considered as a hardware component, and an apparatus included in the controller for implementing various functions can also be considered as a structure in the hardware component. Or the apparatus configured to implement various functions can even be considered as both a software module implementing the method and a structure in the hardware component.

The system, apparatus, module, or unit illustrated in the above-mentioned embodiments can be implemented by using a computer chip or an entity, or can be implemented by using a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, the above-mentioned apparatus is described by dividing functions into various units. Certainly, during implementation of this specification, functions of units can be implemented in the same or more software or hardware.

A person skilled in the art should understand that the implementations of this application can be provided as a method, a system, or a computer program product. Therefore, this application can use a form of hardware only embodiments, software only embodiments, or embodiments with a combination of software and hardware. Moreover, this application can use a form of a computer program product that is implemented on one or more computer-usable storage media (including but not limited to a disk memory, a CD-ROM, an optical memory, etc.) that contain computer-usable program code.

This application is described with reference to the flowcharts and/or block diagrams of the method, the device (system), and the computer program product according to the implementations of this application. It should be understood that computer program instructions can be used to implement each procedure and/or each block in the flowcharts and/or the block diagrams and a combination of a procedure and/or a block in the flowcharts and/or the block diagrams. These computer program instructions can be provided to a processor of a general-purpose computer, a dedicated computer, an embedded processor, or other programmable data processing device to produce a machine, such that instructions executed by a processor of a computer or other programmable data processing device produce an apparatus for implementing a function specified in one or more processes of the flowchart and/or one or more blocks of the block diagram.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, the computing device includes one or more processors (CPU), input/output interfaces, network interfaces, and internal memories.

The internal memory may include a form such as a non-permanent memory, a random access memory (RAM), or a non-volatile memory in a computer-readable medium, for example, a read-only memory (ROM) or a flash memory (flash RAM). The internal memory is an example of the computer-readable medium.

The computer-readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a cassette, a cassette magnetic disk storage, or another magnetic storage device or any other non-transmission medium. The computer storage medium can be configured to store information that can be accessed by a computing device. As specified in this specification, the computer-readable medium does not include transitory computer-readable media (transitory media), such as a modulated data signal and a carrier.

It should also be noted that the term "include", "contain", or any other variant thereof is intended to cover a non-exclusive inclusion, so a process, a method, a product, or a device that includes a list of elements not only includes those elements but also includes other elements that are not expressly listed, or further includes elements inherent to such a process, method, product, or device. In a case without more restrictions, for an element limited by the statement "include a . . . ", a process, method, product, or device that includes the element can further include another same element.

A person skilled in the art should understand that some embodiments of this specification can be provided as methods, systems, or computer program products. Therefore, a form of hardware only embodiments, software only embodiments, or embodiments with a combination of software and hardware can be used in this specification. In addition, this specification can be in a form of a computer program product implemented on one or more computer-usable storage media (including but not limited to a magnetic disk storage, a CD-ROM, an optical storage, etc.) containing computer-usable program code.

This specification can be described in a general context of a computer-executable instruction executed by a computer, for example, a program module. Typically, program modules include routines, programs, objects, components, data structures, etc. that perform specific tasks or implement specific abstract data types. This specification can also be practiced in a distributed computing environment in which tasks are performed by remote processing devices connected via a communication network. In the distributed computing environment, a program module can be located in local and remote computer storage media including a storage device.

Embodiments in this specification are all described in a progressive manner, for same or similar parts in embodiments, mutual reference can be made to these embodiments, and each embodiment focuses on a difference from other embodiments. Particularly, the system embodiments are basically similar to the method embodiments, and therefore are described briefly. For related parts, references can be made to some descriptions in the method embodiments.

The above-mentioned descriptions are merely some embodiments of this specification and are not intended to limit this specification. A person skilled in the art can make various changes and variations to this specification. Any modification, equivalent replacement and improvement made in the spirit and principle of this specification shall be contained in the scope of the claims in this application.

What is claimed is:

1. A computer-implemented method for addressing testing, comprising:

applying to addressing middleware in a test cloud architecture:

creating virtual middleware in response to a received creation request for the virtual middleware;

in response to a configuration request for the virtual middleware, selecting at least one actual address from actual addresses of nodes contained in the test cloud architecture as an address of the virtual middleware, and establishing a channel from the virtual middleware to a user in the test cloud architecture according to the address of the virtual middleware;

when the addressing middleware is in test, running a test case by using the addressing middleware, wherein the test case contains an addressing request used to address, as addressed virtual middleware, the virtual middleware;

determining, by using the addressing middleware and based on attribute information of a user who sends the addressing request and the channel, an address of the addressed virtual middleware as a test address; and comparing the test address with a standard address to obtain a test result of the addressing middleware, wherein the standard address is determined in advance according to the attribute information of the user who sends the addressing request and the channel.

2. The computer-implemented method of claim 1, wherein:

the channel comprises a common channel; and establishing a channel from the virtual middleware to a user in the test cloud architecture, comprises:

for each address of the virtual middleware, when a common channel from the address of the virtual middleware to the user in the test cloud architecture is established, configuring the address as an address corresponding to the common channel, and configuring attribute information of a user allowed to access the address for the common channel; and the attribute information comprises at least one of a logical equipment room in which the user is located, a physical equipment room in which the user is located, or a geographical region in which the user is located.

3. The computer-implemented method of claim 1, wherein:

the channel comprises a dedicated channel;

the user in the test cloud architecture comprises a logic data center (LDC) user; and establishing a channel from the virtual middleware to a user in the test cloud architecture, comprises:

for each address of the virtual middleware, when a dedicated channel from the address of the virtual middleware to the LDC user in the test cloud architecture is established, configuring the address as an address corresponding to the dedicated channel, determining an LDC user who needs to establish the dedicated channel as an LDC user allowed to access the address, and configuring attribute information of the LDC user allowed to access the address for the dedicated channel; and the attribute information comprises at least one of a tenant to which the LDC user belongs, a logical equipment room in which the LDC user is located, a physical equipment room in which the LDC user is located, or a geographical region in which the LDC user is located.

4. The computer-implemented method of claim 1, wherein:

the channel comprises a dedicated channel;

the user in the test cloud architecture comprises a non-logic data center (LDC) user; and establishing a channel from the virtual middleware to a user in the test cloud architecture, comprises:

for each address of the virtual middleware, when a dedicated channel from the address of the virtual middleware to the non-LDC user in the test cloud architecture is established, configuring the address as an address corresponding to the dedicated channel, determining a non-LDC user who needs to establish the dedicated channel as a non-LDC user allowed to access the address, and configuring attribute information of the non-LDC user allowed to access the address for the dedicated channel; and the attribute information comprises at least one of a tenant to which the non-LDC user belongs, a physical equipment room in which the non-LDC user is located, or a geographical region in which the non-LDC user is located.

5. The computer-implemented method of claim 2, wherein:

determining, by using the addressing middleware and based on attribute information of a user who sends the addressing request and the channel, an address of the addressed virtual middleware, comprises:

for each channel, determining, by using the addressing middleware, whether a configuration of the channel contains at least one type of attribute information of the user who sends the addressing request; if yes, determining that the channel is a channel that matches the attribute information of the user who sends the addressing request; or otherwise, determining that the channel is not a channel that matches the attribute information of the user who sends the addressing request; and determining an address corresponding to the channel that matches the attribute information of the user who sends the addressing request as the address of the addressed virtual middleware.

6. The computer-implemented method of claim 5, wherein:

after the establishing, as an established channel, a channel from the virtual middleware to a user in the test cloud architecture:

determining an environment screening condition corresponding to the established channel; and before determining that the channel is a channel that matches the attribute information of the user who sends the addressing request:

determining that an environment in which the user who sends the addressing request is located satisfies the environment screening condition corresponding to the channel.

7. The computer-implemented method of claim 1, wherein:

the address of the virtual middleware comprises at least two actual addresses; and comparing the test address with a standard address to obtain a test result of the addressing middleware, comprises:

determining whether the test address obtained by addressing is in a one-to-one correspondence with the standard address;

if yes, determining that an addressing result of the addressing middleware is accurate; and if no, determining that the addressing result of the addressing middleware is inaccurate.

8. A non-transitory, computer-readable medium storing one or more instructions executable by a computer system to perform one or more operations for addressing testing, comprising:

applying to addressing middleware in a test cloud architecture:

creating virtual middleware in response to a received creation request for the virtual middleware;

in response to a configuration request for the virtual middleware, selecting at least one actual address from actual addresses of nodes contained in the test cloud architecture as an address of the virtual middleware, and establishing a channel from the virtual middleware to a user in the test cloud architecture according to the address of the virtual middleware;

when the addressing middleware is in test, running a test case by using the addressing middleware, wherein the test case contains an addressing request used to address, as addressed virtual middleware, the virtual middleware;

determining, by using the addressing middleware and based on attribute information of a user who sends the addressing request and the channel, an address of the addressed virtual middleware as a test address; and comparing the test address with a standard address to obtain a test result of the addressing middleware, wherein the standard address is determined in advance according to the attribute information of the user who sends the addressing request and the channel.

9. The non-transitory, computer-readable medium of claim 8, wherein:

the channel comprises a common channel; and establishing a channel from the virtual middleware to a user in the test cloud architecture, comprises:

for each address of the virtual middleware, when a common channel from the address of the virtual middleware to the user in the test cloud architecture is established, configuring the address as an address corresponding to the common channel, and configuring attribute information of a user allowed to access the address for the common channel; and the attribute information comprises at least one of a logical equipment room in which the user is located, a physical equipment room in which the user is located, or a geographical region in which the user is located.

10. The non-transitory, computer-readable medium of claim 8, wherein:

the channel comprises a dedicated channel;

the user in the test cloud architecture comprises a logic data center (LDC) user; and establishing a channel from the virtual middleware to a user in the test cloud architecture, comprises:

for each address of the virtual middleware, when a dedicated channel from the address of the virtual middleware to the LDC user in the test cloud architecture is established, configuring the address as an address corresponding to the dedicated channel, determining an LDC user who needs to establish the dedicated channel as an LDC user allowed to access the address, and configuring attribute information of the LDC user allowed to access the address for the dedicated channel; and the attribute information comprises at least one of a tenant to which the LDC user belongs, a logical equipment room in which the LDC user is located, a physical equipment room in which the LDC user is located, or a geographical region in which the LDC user is located.

11. The non-transitory, computer-readable medium of claim 8, wherein:

the channel comprises a dedicated channel;

the user in the test cloud architecture comprises a non-logic data center (LDC) user; and establishing a channel from the virtual middleware to a user in the test cloud architecture, comprises:

for each address of the virtual middleware, when a dedicated channel from the address of the virtual middleware to the non-LDC user in the test cloud architecture is established, configuring the address as an address corresponding to the dedicated channel, determining a non-LDC user who needs to establish the dedicated channel as a non-LDC user allowed to access the address, and configuring attribute information of the non-LDC user allowed to access the address for the dedicated channel; and the attribute information comprises at least one of a tenant to which the non-LDC user belongs, a physical equipment room in which the non-LDC user is located, or a geographical region in which the non-LDC user is located.

12. The non-transitory, computer-readable medium of claim 9, wherein:

determining, by using the addressing middleware and based on attribute information of a user who sends the addressing request and the channel, an address of the addressed virtual middleware, comprises:

for each channel, determining, by using the addressing middleware, whether a configuration of the channel contains at least one type of attribute information of the user who sends the addressing request; if yes, determining that the channel is a channel that matches the attribute information of the user who sends the addressing request; or otherwise, determining that the channel is not a channel that matches the attribute information of the user who sends the addressing request; and determining an address corresponding to the channel that matches the attribute information of the user who sends the addressing request as the address of the addressed virtual middleware.

13. The non-transitory, computer-readable medium of claim 12, wherein:

after the establishing, as an established channel, a channel from the virtual middleware to a user in the test cloud architecture:

determining an environment screening condition corresponding to the established channel; and before determining that the channel is a channel that matches the attribute information of the user who sends the addressing request:

determining that an environment in which the user who sends the addressing request is located satisfies the environment screening condition corresponding to the channel.

14. The non-transitory, computer-readable medium of claim 8, wherein:

the address of the virtual middleware comprises at least two actual addresses; and comparing the test address with a standard address to obtain a test result of the addressing middleware, comprises:

determining whether the test address obtained by addressing is in a one-to-one correspondence with the standard address;

if yes, determining that an addressing result of the addressing middleware is accurate; and if no, determining that the addressing result of the addressing middleware is inaccurate.

15. A computer-implemented system for addressing testing, comprising:

one or more computers; and one or more computer memory devices interoperably coupled with the one or more computers and having tangible, non-transitory, machine-readable media storing one or more instructions that, when executed by the one or more computers, perform one or more operations, comprising:

applying to addressing middleware in a test cloud architecture:

creating virtual middleware in response to a received creation request for the virtual middleware;

in response to a configuration request for the virtual middleware, selecting at least one actual address from actual addresses of nodes contained in the test cloud architecture as an address of the virtual middleware, and establishing a channel from the virtual middleware to a user in the test cloud architecture according to the address of the virtual middleware;

when the addressing middleware is in test, running a test case by using the addressing middleware, wherein the test case contains an addressing request used to address, as addressed virtual middleware, the virtual middleware;

determining, by using the addressing middleware and based on attribute information of a user who sends the addressing request and the channel, an address of the addressed virtual middleware as a test address; and comparing the test address with a standard address to obtain a test result of the addressing middleware, wherein the standard address is determined in advance according to the attribute information of the user who sends the addressing request and the channel.

16. The computer-implemented system of claim 15, wherein:

the channel comprises a common channel; and establishing a channel from the virtual middleware to a user in the test cloud architecture, comprises:

for each address of the virtual middleware, when a common channel from the address of the virtual middleware to the user in the test cloud architecture is established, configuring the address as an address corresponding to the common channel, and configuring attribute information of a user allowed to access the address for the common channel; and the attribute information comprises at least one of a logical equipment room in which the user is located, a physical equipment room in which the user is located, or a geographical region in which the user is located.

17. The computer-implemented system of claim 15, wherein:

the channel comprises a dedicated channel;

the user in the test cloud architecture comprises a logic data center (LDC) user; and establishing a channel from the virtual middleware to a user in the test cloud architecture, comprises:

for each address of the virtual middleware, when a dedicated channel from the address of the virtual middleware to the LDC user in the test cloud architecture is established, configuring the address as an address corresponding to the dedicated channel, determining an LDC user who needs to establish the dedicated channel as an LDC user allowed to access the address, and configuring attribute information of the LDC user allowed to access the address for the dedicated channel; and the attribute information comprises at least one of a tenant to which the LDC user belongs, a logical equipment room in which the LDC user is located, a physical equipment room in which the LDC user is located, or a geographical region in which the LDC user is located.

18. The computer-implemented system of claim 15, wherein:

the channel comprises a dedicated channel;

the user in the test cloud architecture comprises a non-logic data center (LDC) user; and establishing a channel from the virtual middleware to a user in the test cloud architecture, comprises:

for each address of the virtual middleware, when a dedicated channel from the address of the virtual middleware to the non-LDC user in the test cloud architecture is established, configuring the address as an address corresponding to the dedicated channel, determining a non-LDC user who needs to establish the dedicated channel as a non-LDC user allowed to access the address, and configuring attribute information of the non-LDC user allowed to access the address for the dedicated channel; and the attribute information comprises at least one of a tenant to which the non-LDC user belongs, a physical equipment room in which the non-LDC user is located, or a geographical region in which the non-LDC user is located.

19. The computer-implemented system of claim 16, wherein:

determining, by using the addressing middleware and based on attribute information of a user who sends the addressing request and the channel, an address of the addressed virtual middleware, comprises:

for each channel, determining, by using the addressing middleware, whether a configuration of the channel contains at least one type of attribute information of the user who sends the addressing request; if yes, determining that the channel is a channel that matches the attribute information of the user who sends the addressing request; or otherwise, determining that the channel is not a channel that matches the attribute information of the user who sends the addressing request; and determining an address corresponding to the channel that matches the attribute information of the user who sends the addressing request as the address of the addressed virtual middleware.

20. The computer-implemented system of claim 19, wherein:

after the establishing, as an established channel, a channel from the virtual middleware to a user in the test cloud architecture:

determining an environment screening condition corresponding to the established channel; and before determining that the channel is a channel that matches the attribute information of the user who sends the addressing request:

determining that an environment in which the user who sends the addressing request is located satisfies the environment screening condition corresponding to the channel.

* * * * *